(12) United States Patent
Rastogi (10) Patent No.: US 7,653,255 B2
(45) Date of Patent: Jan. 26, 2010

(54) IMAGE REGION OF INTEREST ENCODING

(75) Inventor: Anubha Rastogi, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 878 days.

(21) Appl. No.: 10/858,901

(22) Filed: Jun. 2, 2004

(65) Prior Publication Data
US 2005/0271289 A1 Dec. 8, 2005

(51) Int. Cl.
G06K 9/36 (2006.01)
G06K 9/46 (2006.01)

(52) U.S. Cl. ........................................ 382/251; 382/240
(58) Field of Classification Search ........................ None
See application file for complete search history.

(56) References Cited

U.S. PATENT DOCUMENTS

| | | | |
|---|---|---|---|
| 4,217,571 A | 8/1980 | Hughes et al. | |
| 4,229,810 A | 10/1980 | Thompson | |
| 4,583,410 A | 4/1986 | O'Neil | |
| 4,599,567 A | 7/1986 | Goupillaud et al. | |
| 4,633,449 A | 12/1986 | Ingram et al. | |
| 4,644,507 A | 2/1987 | Ziolkowski | |
| 4,706,499 A | 11/1987 | Anderson | |
| 4,707,812 A | 11/1987 | Martinez | |
| 4,752,916 A | 6/1988 | Loewenthal | |
| 4,768,174 A | 8/1988 | Castle | |
| 4,780,859 A | 10/1988 | Hadidi et al. | |
| 4,884,247 A | 11/1989 | Hadidi et al. | |
| 4,904,073 A | 2/1990 | Lawton et al. | |
| 4,974,187 A | 11/1990 | Lawton | |
| 4,976,333 A | 12/1990 | Pascouet | |
| 5,000,183 A | 3/1991 | Bonnefous | |
| 5,014,134 A | 5/1991 | Lawton et al. | |
| 5,068,911 A | 11/1991 | Resnikoff et al. | |
| 5,073,964 A | 12/1991 | Resnikoff | |
| 5,081,645 A | 1/1992 | Resnikoff et al. | |
| 5,101,446 A | 3/1992 | Resnikoff et al. | |

(Continued)

FOREIGN PATENT DOCUMENTS

EP 00701375 3/1996

(Continued)

OTHER PUBLICATIONS

Christopoulos et al, "The JPEG2000 Still Image Coding System: An Overview", IEEE Trans. Consumer Electronics, vol. 46, Iss. 4, Nov. 2000, pp. 1103-1127.*

(Continued)

Primary Examiner—Matthew C Bella
Assistant Examiner—Yuzhen Ge
(74) Attorney, Agent, or Firm—Fish & Richardson P.C.

(57) ABSTRACT

Methods and apparatus, including computer program products, for compression include decomposing an image into wavelet transform coefficients, applying a first quantizer to the wavelet transform coefficients, and applying a second quantizer to a set of wavelet transform coefficients representing a background of the image. The method can include rounding the wavelet transform coefficients and rounding the wavelet transform coefficients can include rounding to a nearest integer value. The method can include multiplying the set rounded quantized background wavelet transform coefficients by the second quantizer and rounding all wavelet transform coefficients. Rounding all wavelet transform coefficients can include rounding to a nearest integer value.

27 Claims, 2 Drawing Sheets

U.S. PATENT DOCUMENTS

| | | |
|---|---|---|
| 5,106,385 A | 4/1992 | Allen et al. |
| 5,121,191 A | 6/1992 | Cassereau et al. |
| 5,148,498 A | 9/1992 | Resnikoff et al. |
| 5,173,879 A | 12/1992 | Cung et al. |
| 5,193,077 A | 3/1993 | Weiglein et al. |
| 5,253,530 A | 10/1993 | Letcher, III |
| 5,262,958 A | 11/1993 | Chui et al. |
| 5,272,530 A | 12/1993 | Cassereau |
| 5,301,020 A | 4/1994 | Cassereau |
| 5,315,670 A | 5/1994 | Shapiro |
| 5,321,776 A | 6/1994 | Shapiro |
| 5,347,479 A | 9/1994 | Miyazaki |
| 5,347,494 A | 9/1994 | Andersen |
| 5,359,627 A | 10/1994 | Resnikoff |
| 5,377,302 A | 12/1994 | Tsiang |
| 5,384,725 A | 1/1995 | Coifman et al. |
| 5,384,869 A | 1/1995 | Wilkinson et al. |
| 5,388,182 A | 2/1995 | Benedetto et al. |
| 5,392,255 A | 2/1995 | LeBras et al. |
| 5,398,067 A | 3/1995 | Sakamoto |
| 5,408,580 A | 4/1995 | Stautner et al. |
| 5,412,741 A | 5/1995 | Shapiro |
| 5,414,780 A | 5/1995 | Carnahan |
| 5,420,636 A | 5/1995 | Kojima |
| 5,426,618 A | 6/1995 | Chen et al. |
| 5,436,447 A | 7/1995 | Shew |
| 5,439,483 A | 8/1995 | Duong-Van |
| 5,453,945 A | 9/1995 | Tucker et al. |
| 5,454,047 A | 9/1995 | Chang et al. |
| 5,471,991 A | 12/1995 | Shinnar |
| 5,477,272 A | 12/1995 | Zhang et al. |
| 5,481,269 A | 1/1996 | Imhoff et al. |
| 5,495,292 A | 2/1996 | Zhang et al. |
| 5,495,554 A | 2/1996 | Edwards et al. |
| 5,497,398 A | 3/1996 | Tzannes et al. |
| 5,497,435 A | 3/1996 | Berger |
| 5,497,777 A | 3/1996 | Abdel-Malek et al. |
| 5,500,902 A | 3/1996 | Stockham, Jr. et al. |
| 5,504,487 A | 4/1996 | Tucker |
| 5,511,155 A | 4/1996 | Yamaguchi |
| 5,513,273 A | 4/1996 | Ito |
| 5,526,299 A | 6/1996 | Coifman et al. |
| 5,528,725 A | 6/1996 | Hui |
| 5,534,927 A | 7/1996 | Shishikui et al. |
| 5,537,344 A | 7/1996 | Isshiki et al. |
| 5,537,365 A | 7/1996 | Sitoh |
| 5,537,493 A | 7/1996 | Wilkinson |
| 5,546,477 A | 8/1996 | Knowles et al. |
| 5,550,788 A | 8/1996 | Pavone et al. |
| 5,561,431 A | 10/1996 | Peele et al. |
| 5,563,960 A | 10/1996 | Shapiro |
| 5,565,920 A | 10/1996 | Lee et al. |
| 5,576,548 A | 11/1996 | Clarke et al. |
| 5,583,952 A | 12/1996 | Resnikoff et al. |
| 5,587,931 A | 12/1996 | Jones et al. |
| 5,587,965 A | 12/1996 | Dragoset, Jr. et al. |
| 5,588,023 A | 12/1996 | Ho |
| 5,590,222 A | 12/1996 | Kojima |
| 5,590,650 A | 1/1997 | Genova |
| 5,592,171 A | 1/1997 | Jordan |
| 5,592,226 A | 1/1997 | Lee et al. |
| 5,598,481 A | 1/1997 | Nishikawa et al. |
| 5,600,373 A | 2/1997 | Chui et al. |
| 5,602,589 A | 2/1997 | Vishwanath et al. |
| 5,602,760 A | 2/1997 | Chacon et al. |
| 5,604,824 A | 2/1997 | Chui et al. |
| 5,606,642 A | 2/1997 | Stautner et al. |
| 5,610,843 A | 3/1997 | Chou |
| 5,612,700 A | 3/1997 | Tucker |
| 5,615,287 A | 3/1997 | Fu et al. |
| 5,619,998 A | 4/1997 | Abdel-Malek et al. |
| 5,623,939 A | 4/1997 | Garfield |
| 5,627,907 A | 5/1997 | Gur et al. |
| 5,631,610 A | 5/1997 | Sandberg et al. |
| 5,636,246 A | 6/1997 | Tzannes et al. |
| 5,638,068 A | 6/1997 | Nickerson |
| 5,638,823 A | 6/1997 | Akay et al. |
| 5,642,166 A | 6/1997 | Shin et al. |
| 5,646,600 A | 7/1997 | Abdel-Malek et al. |
| 5,657,085 A | 8/1997 | Katto |
| 5,661,822 A | 8/1997 | Knowles et al. |
| 5,663,929 A | 9/1997 | Pavone et al. |
| 5,666,434 A | 9/1997 | Nishikawa et al. |
| 5,666,475 A | 9/1997 | Salesin et al. |
| 5,667,244 A | 9/1997 | Ito et al. |
| 5,668,850 A | 9/1997 | Abdel-Malek |
| 5,671,294 A | 9/1997 | Rogers et al. |
| 5,671,330 A | 9/1997 | Sakamoto et al. |
| 5,673,191 A | 9/1997 | Chapin et al. |
| 5,673,332 A | 9/1997 | Nishikawa et al. |
| 5,675,551 A | 10/1997 | Sitoh |
| 5,675,669 A | 10/1997 | Kim |
| 5,682,152 A | 10/1997 | Wang et al. |
| 5,684,693 A | 11/1997 | Li |
| 5,687,725 A | 11/1997 | Wendt |
| 5,689,429 A | 11/1997 | Depiante |
| 5,699,286 A | 12/1997 | Lee et al. |
| 5,703,965 A | 12/1997 | Fu et al. |
| 5,706,220 A | 1/1998 | Vafai et al. |
| 5,710,432 A | 1/1998 | Bell |
| 5,710,835 A | 1/1998 | Bradley |
| 5,715,280 A | 2/1998 | Sandberg et al. |
| 5,717,791 A | 2/1998 | Labaere et al. |
| 5,724,070 A | 3/1998 | Denninghoff et al. |
| 5,724,138 A | 3/1998 | Reich et al. |
| 5,729,484 A | 3/1998 | Mack et al. |
| 5,729,506 A | 3/1998 | Dragoset, Jr. et al. |
| 5,729,691 A | 3/1998 | Agarwal |
| 5,734,755 A | 3/1998 | Ramchandran et al. |
| 5,737,448 A | 4/1998 | Gardos |
| 5,740,036 A | 4/1998 | Ahuja et al. |
| 5,740,268 A | 4/1998 | Nishikawa et al. |
| 5,745,382 A | 4/1998 | Vilim et al. |
| 5,745,392 A | 4/1998 | Ergas et al. |
| 5,745,604 A | 4/1998 | Rhoads |
| 5,747,749 A | 5/1998 | Bednarczyk et al. |
| 5,748,116 A | 5/1998 | Chui et al. |
| 5,748,471 A | 5/1998 | Grande |
| 5,748,786 A | 5/1998 | Zandi et al. |
| 5,751,716 A | 5/1998 | Tzannes et al. |
| 5,754,438 A | 5/1998 | Naono et al. |
| 5,754,793 A | 5/1998 | Eom et al. |
| 5,757,309 A | 5/1998 | Brooks et al. |
| 5,757,852 A | 5/1998 | Jericevic et al. |
| 5,757,974 A | 5/1998 | Impagliazzo et al. |
| 5,761,341 A | 6/1998 | Go |
| 5,764,805 A | 6/1998 | Martucci et al. |
| 5,774,357 A | 6/1998 | Hoffberg et al. |
| 5,776,073 A | 7/1998 | Garfield et al. |
| 5,777,678 A | 7/1998 | Ogata et al. |
| 5,778,881 A | 7/1998 | Sun et al. |
| 5,781,144 A | 7/1998 | Hwa |
| 5,781,502 A | 7/1998 | Becquey |
| 5,781,881 A | 7/1998 | Stegmann |
| 5,781,888 A | 7/1998 | Herre |
| 5,782,429 A | 7/1998 | Mead |
| 5,784,285 A | 7/1998 | Tamaki et al. |
| 5,787,207 A | 7/1998 | Golin |
| 5,790,131 A | 8/1998 | Liang et al. |
| 5,790,185 A | 8/1998 | Auzerais et al. |
| 5,790,694 A | 8/1998 | Maruo |
| 5,796,434 A | 8/1998 | Lempel |
| 5,798,794 A | 8/1998 | Takahashi |
| 5,799,100 A | 8/1998 | Clarke et al. |

| | | | |
|---|---|---|---|
| 5,799,112 A | 8/1998 | de Queiroz et al. | |
| 5,801,305 A | 9/1998 | Kawai et al. | |
| 5,802,369 A | 9/1998 | Ganesh et al. | |
| 5,802,481 A | 9/1998 | Prieto | |
| 5,808,467 A | 9/1998 | Ochi et al. | |
| 5,812,971 A | 9/1998 | Herre | |
| 5,814,897 A | 9/1998 | Ito et al. | |
| 5,815,097 A | 9/1998 | Schwartz et al. | |
| 5,815,198 A | 9/1998 | Vachtsevanos et al. | |
| 5,818,525 A | 10/1998 | Elabd | |
| 5,819,215 A | 10/1998 | Dobson et al. | |
| 5,821,751 A | 10/1998 | Wendt et al. | |
| 5,821,882 A | 10/1998 | Kazato et al. | |
| 5,822,370 A | 10/1998 | Graupe | |
| 5,822,436 A | 10/1998 | Rhoads | |
| 5,822,459 A | 10/1998 | Macy | |
| 5,825,935 A | 10/1998 | Murakoshi | |
| 5,825,936 A | 10/1998 | Clarke et al. | |
| 5,828,849 A | 10/1998 | Lempel et al. | |
| 5,831,625 A | 11/1998 | Rich et al. | |
| 5,832,030 A | 11/1998 | Tzannes et al. | |
| 5,838,377 A | 11/1998 | Greene | |
| 6,269,193 B1 * | 7/2001 | Young et al. | 382/244 |
| 6,351,491 B1 | 2/2002 | Lee et al. | |
| 6,801,665 B1 * | 10/2004 | Atsumi et al. | 382/239 |
| 6,909,810 B2 * | 6/2005 | Maeda | 382/243 |
| 6,985,632 B2 * | 1/2006 | Sato et al. | 382/240 |
| 7,035,473 B1 * | 4/2006 | Zeng et al. | 382/251 |
| 7,127,117 B2 * | 10/2006 | Sano et al. | 382/240 |
| 2003/0210824 A1 | 11/2003 | Falzon et al. | |
| 2004/0047511 A1 | 3/2004 | Tzannes et al. | |
| 2005/0002573 A1 | 1/2005 | Joshi et al. | |
| 2006/0008162 A1 | 1/2006 | Chen et al. | |

FOREIGN PATENT DOCUMENTS

| | | |
|---|---|---|
| EP | 00855838 | 7/1998 |
| WO | 9738533 | 10/1997 |
| WO | 9828917 | 7/1998 |
| WO | 9840842 | 9/1998 |
| WO | 9844455 | 10/1998 |

OTHER PUBLICATIONS

Christopoulos et al,; "JPEG2000: The New Still Picture Compression Standard," 15 pages. http://www.acm.org/sigs/sigmm/MM2000/ep/christopoulos/.

Marcellin et al.; "An Overview of JPEG-2000," Originally appeared Proc. of IEEE Data Compression Conference, pp. 523-541, 2000; 19 pages.

Skodras et al.; "JPEG2000: The Upcoming Still Image Compression Standard," Pattern Recognition Letters, vol. 22, Issue 12, Oct. 2001. pp. 1337-1345.

Jung et al.; "Segmentation and Compression of Documents with JPEG2000," www.math.tu-berlin.de/~seiler/JPEG2000final1.1.pdf 7 pages.

Yu et al., "An Efficient Packetization Algorithm for JPEG2000," http://ccrc.wustl.edu/~jefritts/papers/weiyu_icip02.pdf 4 pages.

David Taubman et al., "Rate-Distortion Optimized Interactive Browsing of JPEG2000 Images".

Jorg Ritter, "Wavelet based image compression using FPGAs", http://sundoc.bibliothek.uni-halle.de/diss-online/02/U3H033/of_intlex.htm.

T. M. Trenschel et al., "Region-Based Guaranteed Image Quality in JPEG2000".

T. Trenschel et al., "Using JPEG2000 On-Board Mini-Satellites for Image-Driven Compression".

"Tiles and Tile Components: Enable Simplified Processing" The University of Arizona, pp. 18-32.

Al Bovik, "Handbook of Image & Video Processing", pp. 53-67, 117-123, 289-300, 301-312, 495-512, 575-584 and 629-643, Academic Press, 2000.

Pankaj N. Topiwala, "Time-Frequency Analysis, Wavelets and Filter Banks", pp. 1-81.

"Wavelet Basics", http://www.monash.edu.au/-mcm/wavelet/wbasic.htm.

"Highly Efficient Image Compression- Hardware Solution (HFEE-DP)", http://www.luratech.com/rdprojects/reprojects01_e.html.

"LuraWave Software, Development Kit for C/C++", LuRaTech GmbH, 1998.

Stephane G. Mallat, "Multifrequency Channel Decompositions of Images and Wavelet Models", IEEE Transactions on Acoustics, Speech, and Signal Processing, vol. 37, No. 12, Dec. 1989, pp. 2091-2110.

Amara Graps, "An Introduction to Wavlets", IEEE Computational Science & Engineering, Summer 1995, pp. 50-61.

"An Introduction to Wavelets", http://www.amara.com/IEEEwave/IEEEwavelet.html.

"Wavelets Theory", Covering Next Generation Computing and Communications Technologies, http://www.wave-report.com/tutorials/Wavelets.com.

"Our New Standard!", JPEG 2000, file://C:Document, http://www.jpeg.org/jpeg2000/j2K....html.

Amara Graps, "An Introduction to Wavelets", Institute of Electrical and Electronics Engineers, Inc., IEEE Computational Science and Engineering, 1995.

"JPEG 2000 Part 1 with Cor. 1, Cor. 2, Cor. 3 and DCor.4, Amd.1, FPDAM.2", ISO/IEC JTC1/5C29 WG1, JPEG 2000, May 7, 2002.

"JPEG 2000 Part II Final Committee Draft", ISO/IEC JTC1/5C29 WG1, JPEG 2000, Dec. 7, 2000.

Adobe Systems Incorporated, "Optimization Options for GIF and PNG-8 Formats"Adobe Photoshop 7.0 User Guide, 2002, Chapter 14, 3 pages.

LeCun, et al,."DjVu: A Compression Method for Distributing Scanned Documents in Color over the Internet", Color 6, IST, 1998, 4 pages.

Lin, et al. "Hybrid Image Coding for Real-Time Computer Screen Video Transmission", Visual Communications and Image Processing (VCIP 2004), San Jose, California, USA, Jan. 2004, SPIE vol. 5308, pp. 946-957 (12 pages).

Xerox Technology, "MRC & JBIG2", downloaded from the internet at http://www.xeroxtechnologv.com on Mar. 9, 2004, 3 pages.

\* cited by examiner

IMAGE REGION OF INTEREST ENCODING

BACKGROUND

The present invention relates to image region of interest encoding.

Image compression is minimizing the size in bytes of a graphics file without degrading the quality of the image to an unacceptable level. The reduction in file size allows more images to be stored in a given amount of disk or memory space. It also reduces the time required for images to be sent over the Internet or downloaded from Web pages.

There are several different standards that define the ways in which image files can be compressed. Three common standards, for example, are the Joint Photographic Experts Group (JPEG) standard, the JPEG2000 standard and the Graphics Interchange Format (GIF) standard.

The JPEG2000 digital image compression standard, for example, allows the compression of an arbitrary region of interest (e.g., foreground) within an image to be compressed at a higher quality than the remainder of the image (e.g., background). The JPEG2000 digital image standard uses the "max shift" method in conjunction with a post compression rate distortion (PCRD) optimization. In the max shift method, an image is first transformed into a wavelet domain and a subset of coefficients that contribute to a foreground are determined. The foreground coefficients are "left shifted" so that the modified foreground coefficients are larger than the largest possible background coefficient.

A decoder can now identify whether a coefficient belongs to the foreground or background by simply looking at its value. The coefficients of the foreground are now very large numbers and hence an error occurring in these coefficients is penalized by a large distortion. The PCRD optimization ensures that these foreground coefficients are included prior to background coefficients, which ensures that a large part of the bit budget is given to the encoding of the foreground coefficients.

SUMMARY

The present invention provides methods and apparatus, including computer program products, for image region of interest encoding.

In general, in one aspect, the invention features a method of encoding including decomposing an image into wavelet transform coefficients, quantizing the wavelet transform coefficients with a high resolution scalar quantizer, quantizing a set of background wavelet transform coefficients with a low resolution scalar quantizer, rounding the set of quantized background wavelet transform coefficients, multiplying the set rounded quantized background wavelet transform coefficients by the low resolution scalar quantizer, and rounding all wavelet transform coefficients.

In embodiments, the method can include entropy encoding all wavelet transform coefficients. The method can include generating a preview of the encoded wavelet transform coefficients and/or signaling the high resolution scalar quantizer in a header.

Rounding all wavelet transform coefficients can include flooring to a largest integer smaller than a value of the quantized wavelet coefficient or choosing a smallest integer value larger than a value of the quantized wavelet coefficient.

In another aspect, the invention features a method of encoding including decomposing an image into wavelet transform coefficients, quantizing the wavelet transform coefficients with a high resolution scalar quantizer, rounding the wavelet transform coefficients, quantizing a set of rounded background wavelet transform coefficients with a low resolution scalar quantizer, rounding the set of quantized background wavelet transform coefficients to a nearest integer value, and multiplying the set rounded quantized background wavelet transform coefficients by the low resolution scalar quantizer.

In embodiments, the method can include entropy encoding all wavelet transform coefficients.

The method can include generating a preview of the encoded wavelet transform coefficients and/or signaling the high resolution scalar quantizer in a header.

Rounding the set of quantized background wavelet transform coefficients can include rounding to a nearest integer value and rounding all wavelet transform coefficients can include rounding to a nearest integer value.

Rounding the set of quantized background wavelet transform coefficients and rounding all wavelet transform coefficients can include flooring to a largest integer smaller than a value of the quantized wavelet coefficient.

Rounding the set of quantized background wavelet transform coefficients and rounding all wavelet transform coefficients can include choosing a smallest integer value larger than a value of the quantized wavelet coefficient.

In another aspect, the invention features a method of compression including decomposing an image into wavelet transform coefficients, applying a first quantizer to the wavelet transform coefficients, and applying a second quantizer to a set of wavelet transform coefficients representing a background of the image.

In embodiments, the method can include rounding the wavelet transform coefficients and rounding the wavelet transform coefficients can include rounding to a nearest integer value.

The method can include multiplying the set rounded quantized background wavelet transform coefficients by the second quantizer and rounding all wavelet transform coefficients. Rounding all wavelet transform coefficients can include rounding to a nearest integer value.

The method can include entropy encoding all wavelet transform coefficients, generating a preview of the encoded wavelet transform coefficients, and/or signaling the first quantizer in a header.

In another aspect, the invention features a system of encoding including a means for decomposing an image into wavelet transform coefficients, a means for quantizing the wavelet transform coefficients with a high resolution scalar quantizer, a means for quantizing a set of background wavelet transform coefficients with a low resolution scalar quantizer, a means for rounding the set of quantized background wavelet transform coefficients, a means for multiplying the set rounded quantized background wavelet transform coefficients by the low resolution scalar quantizer, and a means rounding all wavelet transform coefficients.

In embodiments, the system can include a means for entropy encoding all wavelet transform coefficients and/or a means for generating a preview of the encoded wavelet transform coefficients. The system can also include a means for signaling the high resolution scalar quantizer in a header.

The means for rounding the set of quantized background wavelet transform coefficients can include rounding to a nearest integer value. The means for rounding all wavelet transform coefficients can include rounding to a nearest integer value. The means for rounding all wavelet transform coefficients can include flooring to a largest integer smaller than a value of the quantized wavelet coefficient. The means for rounding all wavelet coefficients can include choosing a smallest integer value larger than a value of the quantized wavelet coefficient.

The invention can be implemented to realize one or more of the following advantages.

A user's choice of image quality for a region of interest (foreground) is mapped to a high resolution scalar quantizer and the image quality chosen for a background is mapped to a low resolution (coarse) scalar quantizer. The quantizers for the foreground and the background can be chosen independently.

After wavelet transform, the transformed image includes several sub-bands. The term quantization implies quantizing each coefficient of each sub-band with a quantizer; the quantizer can be different for different sub-bands but is same for all coefficients within a sub-band. Thus, there is a set of high and coarse resolution quantizers, one for each sub-band.

The image is transformed into the wavelet domain by applying the forward discrete wavelet transform and the wavelet coefficients of each sub-band that contribute to the foreground are determined. All coefficients of each sub-band are then quantized, background as well as foreground, with a high resolution quantizer. The background is then quantized with the low resolution quantizer, rounded to a nearest integer value and multiplied back by the low resolution quantizer.

The modified wavelet coefficients are now encoded and the values of the high resolution quantizer are signaled in the encoded stream. Upon decoding, the foreground will appear with a better quality compared to the background.

The process can encode different regions with more than two qualities. That is, one can have regions r1, r2, r3 . . . , with qualities q1, q2, q3 . . . . The process quantizes all wavelet transform coefficients with the smallest quantizer (high resolution) and then each region of interest is individually subjected to quantization by the coarse quantizer for that region; rounding the coefficients to nearest integer values and multiplying back by the coarse resolution quantizer.

The region of interest encoding process is not restricted to JPEG2000. The process can be used in any place where a wavelet based transform is performed.

The quantized wavelet transform coefficients finally may or may not be entropy coded. Entropy encoding is not restricted to the JPEG2000 entropy coding system. Entropy encoding can include, for example, Huffmann based systems, zip systems, flate, run length, and so forth. One need not perform any compression and only write the coefficients as they are to a codestream.

The process can include generating a preview of the encoded image before performing actual encoding. Thus, a user gets feedback on the quality of the foreground and background and can adjust the qualities to his satisfaction.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 is a flow diagram.
Like reference numbers and designations in the various drawings indicate like elements.

DETAILED DESCRIPTION

Figure 1:
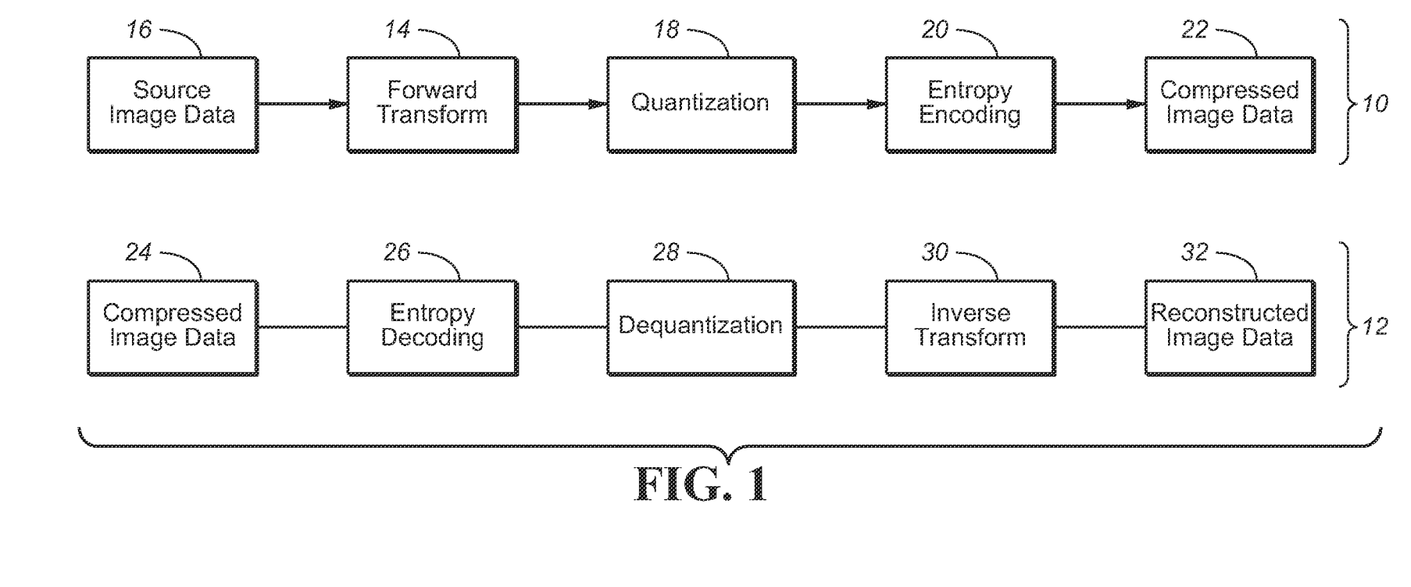
FIG. 1 is block diagram.

As shown in FIG. 1, the JPEG2000 standard includes encoding 10 and decoding 12. We use the JPEG2000 standard as one example. However, the process described herein in not limited to the JPEG2000 standard, and can be used in any place where a wavelet based transform is performed.

In encoding 10, a discrete wavelet transform 14 is first applied on the source image data 16. The transform coefficients are then quantized 18 and entropy coded 20, before forming the output codestream (bitstream) 22. In decoding 12, the codestream 24 is first entropy-decoded 26, dequantized 28 and undergoes the inverse discrete wavelet transform 30 to produce the reconstructed image 32. The JPEG2000 standard allows tiling of the image. Tiles are encoded independently.

Figure 2:
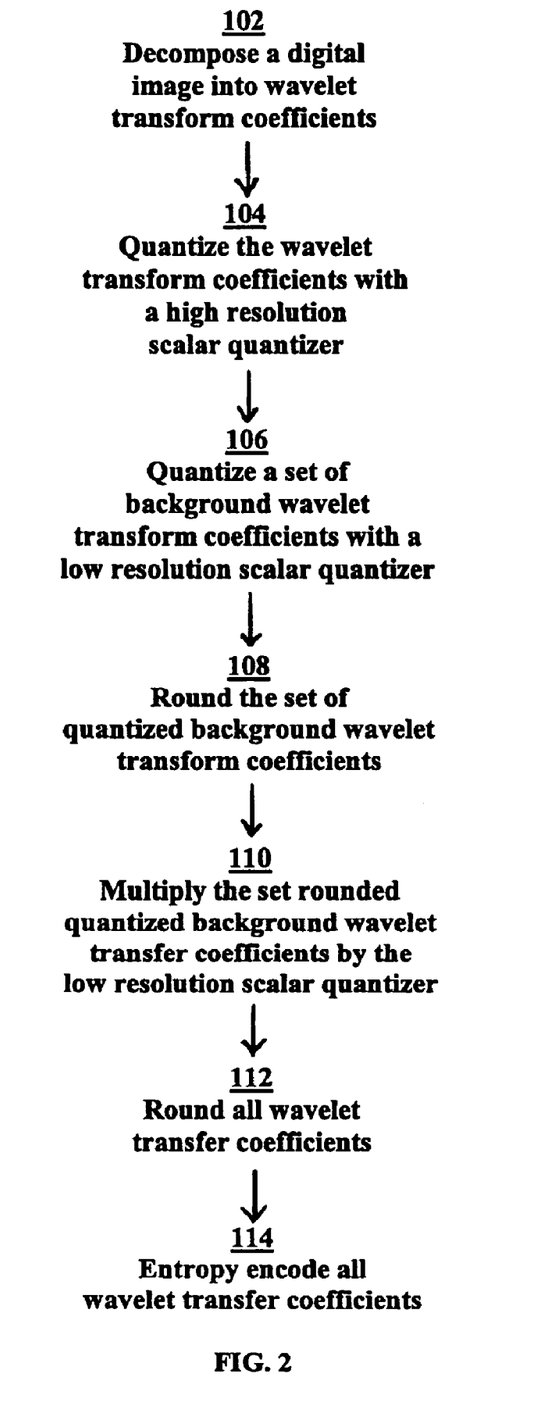

As shown in FIG. 2, a process 100 of region of interest encoding includes decomposing (102) an image into wavelet transform coefficients. A wavelet transform is a transformation to basis functions that are localized in both frequency and spatial domains. As basis functions one uses wavelets. An advantage over a Fourier transform is the temporal (or spatial) locality of the base functions and the smaller complexity (O(N) instead of O(N log N) for the fast Fourier transform (where N is the data size).

Process 100 includes quantizing (104) the wavelet transform coefficients with a high resolution scalar quantizer. Quantization (104) is a process by which the coefficients are reduced in precision. This operation is lossy, unless the quantization (104) is 1 and the coefficients are integers, as produced by the reversible integer 5/3 wavelet. For example, each of the transform coefficients $a_b(u,v)$ of a subband b is quantized to a value $q_b(u,v)$ according to the formula:

$$q_b(u,v) = \text{sign}(a_b(u,v)) \left\lfloor \frac{|a_b(u,v)|}{\Delta_b} \right\rfloor$$

The quantization $\Delta_b$ is represented relative to the dynamic range $R_b$ of subband b, by the exponent $\epsilon_b$ and mantissa $\mu_b$ as:

$$\Delta_b = 2^{R_b - z_b}\left(1 + \frac{\mu_b}{2^{11}}\right)$$

The dynamic range $R_b$ depends on a number of bits used to represent the original image component and on the choice of the wavelet transform. All quantized transform coefficients are signed values even when the original components are unsigned. These coefficients are expressed in a sign-magnitude representation prior to coding.

Process 100 includes quantizing (106) a set of background wavelet transform coefficients, which have already been quantized (104) by a high resolution quantizer, with a low resolution (i.e., coarse) scalar quantizer and rounding (108) the set of quantized background wavelet transform coefficients.

The set of rounded quantized background wavelet transform coefficients are multiplied (110) by the low resolution scalar quantizer and all wavelet transform coefficients are rounded (112).

Process 100 includes entropy encoding (114) all wavelet transform coefficients. After entropy encoding (114) the high resolution scalar quantizer is signaled in a header.

Process 100 encodes a region of interest without performing a PCRD optimization. Instead, a set of foreground wavelet transform coefficients (e.g., a region of interest) and a set of background wavelet transform coefficients are quantized by two different quantizers. Since there are two independent quantizers, background and foreground qualities can be set independently. Process 100 does not introduce extra bitplanes in the region of interest, and as PCRD optimization is not involved, encoding is fast and memory constrained.

Images with regions of interest are smaller than images without regions of interest because by quantizing the background with a coarse quantizer, rounding to nearest integer and multiplying back with the quantizer, many zeros are introduced in the lower significant bitplanes of the background. These zeros get compressed to a higher degree by entropy coding (114).

Process 100 can be understood more fully by an example. Consider the following example set of wavelet transform coefficients belonging to a particular sub-band from decomposing (102) an image:

| 10.30 | 5.70 | 11.20 | 9.80 | 20.50 | 21.40 | 9.00 |
|---|---|---|---|---|---|---|
| 6.10 | 4.20 | 10.70 | 8.30 | 12.60 | 13.00 | 12.00 |
| 15.20 | 6.80 | 7.20 | 8.30 | 8.54 | 9.60 | 4.90 |

In this example, we designate columns 3, 4 and 5 as belonging to a region of interest (also referred as a foreground), and columns 1, 2, 6 and 7 as belonging to a background. Any region of interest can be selected by a user. In this example we arbitrarily select a value of a low resolution (coarse) scalar quantizer at 3.5 and a value of a high resolution scalar quantizer as 1.2.

After quantizing (104) the above wavelet transform coefficients with the high resolution scalar quantizer we obtain the following values for the wavelet transform coefficients:

| 8.58 | 4.75 | 9.33 | 8.16 | 17.08 | 17.83 | 7.50 |
|---|---|---|---|---|---|---|
| 5.08 | 3.50 | 8.92 | 6.92 | 10.5 | 10.83 | 10.00 |
| 12.66 | 5.66 | 6.00 | 6.92 | 7.12 | 8.0 | 4.08 |

The set of background wavelet transform coefficients (i.e., coefficients contained in columns 1, 2, 6 and 7) are quantized (106) with the low resolution scalar quantizer to obtain the following results:

| 2.45 | 1.36 | 9.33 | 8.16 | 17.08 | 5.09 | 2.14 |
|---|---|---|---|---|---|---|
| 1.45 | 1.00 | 8.92 | 6.92 | 10.50 | 3.09 | 2.86 |
| 3.62 | 1.62 | 6.00 | 6.92 | 7.12 | 2.29 | 1.166 |

The set of background wavelet transform coefficients are rounded (108) to obtain the following:

| 2.00 | 1.00 | 9.33 | 8.16 | 17.08 | 5.00 | 2.00 |
|---|---|---|---|---|---|---|
| 1.00 | 1.00 | 8.92 | 6.92 | 10.50 | 3.00 | 3.00 |
| 4.00 | 2.00 | 6.00 | 6.92 | 7.12 | 2.00 | 1.00 |

The set of background wavelet transform coefficients above are multiplied (110) by the low resolution scalar quantizer to obtain the following:

| 7.00 | 3.50 | 9.33 | 8.16 | 17.08 | 17.50 | 7.00 |
|---|---|---|---|---|---|---|
| 3.50 | 3.50 | 8.92 | 6.92 | 10.50 | 10.50 | 10.50 |
| 14.00 | 7.00 | 6.00 | 6.92 | 7.12 | 7.00 | 3.50 |

All wavelet transform coefficients are rounded (112):

| 7.00 | 4.00 | 9.00 | 8.00 | 17.00 | 18.00 | 7.00 |
|---|---|---|---|---|---|---|
| 4.00 | 4.00 | 9.00 | 7.00 | 11.00 | 11.00 | 11.00 |
| 14.00 | 7.00 | 6.00 | 7.00 | 7.00 | 7.00 | 4.00 |

The above set of wavelet transform coefficients are entropy coded (114). The high resolution quantizer is signaled in a header.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The details of one or more embodiments of the invention are set forth in the accompanying drawings and the description below. Other features and advantages of the invention will become apparent from the description, the drawings, and the claims.

The invention claimed is:

1. A method of encoding comprising:
   decomposing an image into wavelet transform coefficients;
   quantizing the wavelet transform coefficients with a high resolution scalar quantizer;
   quantizing a set of background wavelet transform coefficients with a low resolution scalar quantizer;

rounding the set of quantized background wavelet transform coefficients;
multiplying the set of rounded quantized background wavelet transform coefficients by the low resolution scalar quantizer; and
rounding all wavelet transform coefficients;
wherein quantizing the wavelet transform coefficients is performed by one or more processors.

2. The method of claim 1 further comprising entropy encoding all wavelet transform coefficients.

3. The method of claim 2 further comprising signaling the high resolution scalar quantizer in a header.

4. The method of claim 1 wherein rounding the set of quantized background wavelet transform coefficients comprises rounding to a nearest integer value.

5. The method of claim 1 wherein rounding all wavelet transform coefficients comprises rounding to a nearest integer value.

6. The method of claim 1 wherein rounding all wavelet transform coefficients comprises flooring to a largest integer smaller than a value of the quantized wavelet coefficient.

7. The method of claim 1 wherein rounding all wavelet coefficients comprises choosing a smallest integer value larger than a value of the quantized wavelet coefficient.

8. A method of encoding comprising:
decomposing an image into wavelet transform coefficients;
quantizing the wavelet transform coefficients with a high resolution scalar quantizer;
rounding the wavelet transform coefficients;
quantizing a set of rounded background wavelet transform coefficients with a low resolution scalar quantizer;
rounding the set of quantized background wavelet transform coefficients to a nearest integer value; and
multiplying the set of rounded quantized background wavelet transform coefficients by the low resolution scalar quantizer;
wherein quantizing the wavelet transform coefficients is performed by one or more processors.

9. The method of claim 8 further comprising entropy encoding all wavelet transform coefficients.

10. The method of claim 9 further comprising signaling the high resolution scalar quantizer in a header.

11. The method of claim 8 wherein rounding the set of quantized background wavelet transform coefficients comprises rounding to a nearest integer value.

12. The method of claim 8 wherein rounding all wavelet transform coefficients comprises rounding to a nearest integer value.

13. The method of claim 8 wherein rounding the set of quantized background wavelet transform coefficients and rounding all wavelet transform coefficients comprises flooring to a largest integer smaller than a value of the quantized wavelet coefficient.

14. The method of claim 8 wherein rounding the set of quantized background wavelet transform coefficients and rounding all wavelet transform coefficients comprises choosing a smallest integer value larger than a value of the quantized wavelet coefficient.

15. A computer program, tangibly stored on a computer-readable storage device, for encoding an image, comprising instructions operable to cause a programmable processor to:
decompose an image into wavelet transform coefficients;
quantize the wavelet transform coefficients with a high resolution scalar quantizer;
quantize a set of background wavelet transform coefficients with a low resolution scalar quantizer;
round the set of quantized background wavelet transform coefficients;
multiply the set of rounded quantized background wavelet transform coefficients by the low resolution scalar quantizer; and
round all wavelet transform coefficients.

16. The product of claim 15 further comprising instructions operable to cause the programmable processor to entropy encode all wavelet transform coefficients.

17. The product of claim 16 further comprising instructions operable to cause the programmable processor to signal the high resolution scalar quantizer in a header.

18. The product of claim 15 wherein rounding the set of quantized background wavelet transform coefficients comprises rounding to a nearest integer value.

19. The product of claim 15 wherein rounding all wavelet transform coefficients comprises rounding to a nearest integer value.

20. A system of encoding comprising:
means for decomposing an image into wavelet transform coefficients;
means for quantizing the wavelet transform coefficients with a high resolution scalar quantizer;
means for quantizing a set of background wavelet transform coefficients with a low resolution scalar quantizer;
means for rounding the set of quantized background wavelet transform coefficients;
means for multiplying the set of rounded quantized background wavelet transform coefficients by the low resolution scalar quantizer; and
means for rounding all wavelet transform coefficients.

21. The system of claim 20 further comprising means for entropy encoding all wavelet transform coefficients.

22. The system of claim 21 further comprising means for generating a preview of the encoded wavelet transform coefficients.

23. The system of claim 21 further comprising means for signaling the high resolution scalar quantizer in a header.

24. The system of claim 20 wherein means for rounding the set of quantized background wavelet transform coefficients comprises rounding to a nearest integer value.

25. The system of claim 20 wherein means for rounding all wavelet transform coefficients comprises rounding to a nearest integer value.

26. The system of claim 20 wherein means for rounding all wavelet transform coefficients comprises flooring to a largest integer smaller than a value of the quantized wavelet coefficient.

27. The system of claim 20 wherein means for rounding all wavelet coefficients comprises choosing a smallest integer value larger than a value of the quantized wavelet coefficient.

* * * * *

UNITED STATES PATENT AND TRADEMARK OFFICE
CERTIFICATE OF CORRECTION

PATENT NO. : 7,653,255 B2
APPLICATION NO. : 10/858901
DATED : January 26, 2010
INVENTOR(S) : Anubha Rastogi It is certified that error appears in the above-identified patent and that said Letters Patent is hereby corrected as shown below:

Column 8, line 15, in claim 16, delete "The product of" and insert --The computer program of--.

Column 8, line 18, in claim 17, delete "The product of" and insert --The computer program of--.

Column 8, line 21, in claim 18, delete "The product of" and insert --The computer program of--.

Column 8, line 24, in claim 19, delete "The product of" and insert --The computer program of--.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,653,255 B2 Page 1 of 1
APPLICATION NO. : 10/858901
DATED : January 26, 2010
INVENTOR(S) : Rastogi It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 878 days.

Delete "878 days" and insert --1129 days--.

Signed and Sealed this

Twenty-seventh Day of July, 2010

David J. Kappos
*Director of the United States Patent and Trademark Office*